United States Patent
Chakra et al.

(10) Patent No.: US 10,712,164 B2
(45) Date of Patent: *Jul. 14, 2020

(54) TRAVEL ROUTES BASED ON COMMUNICATION CHANNEL AVAILABILITY

(71) Applicant: International Business Machines Corporation, Armonk, NY (US)

(72) Inventors: Al Chakra, Apex, NC (US); Jonathan Dunne, Dungarvan (IE); Liam Harpur, Skerries (IE); John Rice, Tramore (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/497,035

(22) Filed: Sep. 25, 2014

(65) Prior Publication Data

US 2016/0091333 A1 Mar. 31, 2016

(51) Int. Cl.
*G01C 21/36* (2006.01)

(52) U.S. Cl.
CPC ..... *G01C 21/3617* (2013.01); *G01C 21/3667* (2013.01)

(58) Field of Classification Search
CPC .... G01C 21/3461; G01C 21/34; G01C 21/20; G01C 21/3453; G01C 23/005; G01C 21/00; G01C 22/00; G01C 21/28; G01C 21/32; G01C 21/3492; G01C 21/3629; G01C 21/3407; G01C 21/3476; G01C 21/3617; G01C 21/3667; G01C 21/3469;

(Continued)

(56) References Cited

U.S. PATENT DOCUMENTS 6,216,086 B1 * 4/2001 Seymour ............ G01C 21/3446
701/425
6,236,933 B1 * 5/2001 Lang .................... G08G 1/0104
340/905

(Continued)

FOREIGN PATENT DOCUMENTS

WO 0171485 A1 9/2001
WO 2012078755 A2 6/2012

OTHER PUBLICATIONS

IBM: List of IBM Patents or Patent Applications Treated as Related.
(Continued)

*Primary Examiner* — Hunter B Lonsberry
*Assistant Examiner* — Luis A Martinez Borrero
(74) *Attorney, Agent, or Firm* — Cuenot, Forsythe & Kim, LLC

(57) ABSTRACT

Arrangements relate to determining a travel route. An origin and a destination of intended travel can be received. A plurality of first inputs can be received. Each first input can relate to the availability of a respective communication channel between the origin and the destination. Each first input can create at least one data item representing the availability of the respective communication channel. One or more suggested travel routes between the origin and the destination can be determined based on one or more of the received plurality of first inputs. At least a subset of the determined one or more suggested travel routes can be presented to a user.

8 Claims, 4 Drawing Sheets

(58) Field of Classification Search
CPC .......... G01C 21/26; H04W 4/38; H04W 4/70; H04W 12/003; H04L 1/00; H04L 5/00; H04L 1/18
USPC ..... 701/425, 117, 408, 465, 410, 3, 25, 414, 701/424, 426, 491, 519, 1, 2, 423, 23, 701/409
See application file for complete search history.

(56) References Cited

U.S. PATENT DOCUMENTS

| | | | | |
|---|---|---|---|---|
| 6,542,812 | B1* | 4/2003 | Obradovich | G01C 21/3461 701/426 |
| 6,597,906 | B1* | 7/2003 | Van Leeuwen | H04W 64/006 455/422.1 |
| 6,721,572 | B1* | 4/2004 | Smith | H04W 4/029 455/456.1 |
| 6,898,432 | B1* | 5/2005 | Jiang | H04W 4/04 370/310.2 |
| 7,020,468 | B2* | 3/2006 | Squibbs | H04W 99/00 455/404.2 |
| 7,127,213 | B2* | 10/2006 | Haymes | H04W 24/00 455/67.11 |
| 7,289,904 | B2* | 10/2007 | Uyeki | G01C 21/3492 340/995.13 |
| 7,522,995 | B2* | 4/2009 | Nortrup | G01C 21/3407 701/425 |
| 7,603,115 | B2* | 10/2009 | Banavar | H04W 76/19 455/421 |
| 7,609,678 | B2 | 10/2009 | Sharma et al. | |
| 7,680,594 | B2* | 3/2010 | Cabral | G01C 21/3492 340/906 |
| 7,689,350 | B2* | 3/2010 | Lapstun | A63F 9/183 701/425 |
| 8,099,136 | B2* | 1/2012 | Kawasaki | H04L 29/06 455/405 |
| 8,175,802 | B2* | 5/2012 | Forstall | G01C 21/3484 701/424 |
| 8,311,741 | B1 | 11/2012 | Lawther et al. | |
| 8,355,871 | B2* | 1/2013 | Schunder | G01C 21/34 340/988 |
| 8,370,053 | B2* | 2/2013 | Li | G08G 1/01 340/995.1 |
| 8,385,964 | B2* | 2/2013 | Haney | H04W 4/10 455/519 |
| 8,510,036 | B2* | 8/2013 | Sekiyama | G01C 21/3617 701/400 |
| 8,589,070 | B2* | 11/2013 | Ban | G01C 21/165 701/445 |
| 8,599,806 | B2* | 12/2013 | Jaynes | G06F 17/3087 370/338 |
| 8,606,517 | B1* | 12/2013 | Ehrlacher | G08G 1/096811 701/117 |
| 8,645,060 | B2 | 2/2014 | Venkatraman | |
| 8,787,917 | B1* | 7/2014 | Barrett | G01C 21/3461 455/445 |
| 8,868,791 | B2* | 10/2014 | Famolari | H04L 69/18 709/250 |
| 9,057,620 | B2* | 6/2015 | Dave | G01C 21/3453 |
| 9,239,246 | B2* | 1/2016 | Jones | G01C 21/3682 |
| 9,255,807 | B2* | 2/2016 | Lee | G01C 21/34 |
| 9,295,022 | B2* | 3/2016 | Bevan | H04W 16/28 |
| 9,476,715 | B2* | 10/2016 | Wharton | G01C 21/3461 |
| 9,622,142 | B2* | 4/2017 | Burton | H04W 36/32 |
| 9,694,882 | B2* | 7/2017 | Lee | G01C 21/34 |
| 10,139,243 | B2* | 11/2018 | Rovik | G01C 21/3682 |
| 2004/0215390 | A1* | 10/2004 | Nomura | G01C 21/3461 701/425 |
| 2005/0037755 | A1* | 2/2005 | Hind | H04W 48/18 455/435.3 |
| 2005/0222756 | A1* | 10/2005 | Davis | G01C 21/3484 701/466 |
| 2006/0135180 | A1* | 6/2006 | Jakel | H04W 48/16 455/456.5 |
| 2008/0009324 | A1* | 1/2008 | Patel | H04W 48/18 455/566 |
| 2008/0027636 | A1* | 1/2008 | Tengler | G01C 21/3484 701/425 |
| 2008/0270016 | A1* | 10/2008 | Proietty | G01C 21/3469 701/123 |
| 2008/0287125 | A1* | 11/2008 | Hind | H04W 48/18 455/432.1 |
| 2009/0017840 | A1* | 1/2009 | Camp, Jr. | G01C 21/367 455/456.3 |
| 2009/0054061 | A1* | 2/2009 | Dawson | H04W 48/18 455/434 |
| 2010/0088025 | A1* | 4/2010 | Garg | G01C 21/3461 701/533 |
| 2010/0240346 | A1* | 9/2010 | Jain | H04W 4/02 455/414.1 |
| 2010/0250269 | A1* | 9/2010 | Rappaport | G06Q 10/067 705/1.1 |
| 2010/0292914 | A1* | 11/2010 | Vepsalainen | G01C 21/3453 701/532 |
| 2010/0312465 | A1* | 12/2010 | Tu | G01C 21/3461 701/533 |
| 2012/0009890 | A1* | 1/2012 | Curcio | H04L 29/06 455/230 |
| 2012/0131212 | A1* | 5/2012 | Tang | G01C 21/3423 709/228 |
| 2012/0243436 | A1* | 9/2012 | Hind | H04W 48/18 370/254 |
| 2013/0024107 | A1* | 1/2013 | Xie | G01C 21/3461 701/423 |
| 2013/0130678 | A1* | 5/2013 | Zanier | H04W 48/18 455/433 |
| 2013/0179925 | A1* | 7/2013 | Woods | H04N 21/42209 725/42 |
| 2013/0261956 | A1* | 10/2013 | Marks | G01C 21/3423 701/425 |
| 2013/0325571 | A1* | 12/2013 | Green | G01C 21/34 705/14.15 |
| 2014/0005924 | A1* | 1/2014 | Letz | G01C 21/3484 701/424 |
| 2014/0018016 | A1* | 1/2014 | Chang | H04M 1/7253 455/90.1 |
| 2014/0018061 | A1 | 1/2014 | Hadinata et al. | |
| 2014/0052372 | A1* | 2/2014 | Berus | G01C 21/3461 701/533 |
| 2014/0067257 | A1* | 3/2014 | Dave | H04W 24/08 701/423 |
| 2014/0199980 | A1* | 7/2014 | Rao | H04W 4/029 455/414.1 |
| 2014/0200038 | A1* | 7/2014 | Rao | H04W 4/029 455/457 |
| 2014/0278064 | A1* | 9/2014 | Lee | G01C 21/34 701/428 |
| 2014/0309927 | A1* | 10/2014 | Ricci | B60Q 1/00 701/424 |
| 2014/0309929 | A1* | 10/2014 | Ricci | G06F 3/0622 701/425 |
| 2014/0330505 | A1* | 11/2014 | Wenneman | G01C 21/3484 701/117 |
| 2014/0347368 | A1* | 11/2014 | Kishore | G06T 13/00 345/473 |
| 2014/0379252 | A1* | 12/2014 | Sorokin | G01C 21/3461 701/426 |
| 2015/0142301 | A1* | 5/2015 | Dave | H04W 4/024 701/423 |
| 2015/0177014 | A1* | 6/2015 | Hosoi | G01C 21/3461 701/425 |
| 2020/0005639 | A1* | 1/2020 | Walsh | G08G 5/0013 |
| 2020/0007410 | A1* | 1/2020 | Walsh | H04W 4/44 |

OTHER PUBLICATIONS

Chakra et al., U.S. Appl. No. 14/725,902, filed May 29, 2015, "Travel Routes Based on Communication Channel Availability," 35 pages.

(56) References Cited

OTHER PUBLICATIONS

"Deerfield Beach / Food, Nightlife, Entertainment," [online] Foursquare.com [retrieved Jun. 24, 2014], retrieved from the Internet: <https://foursquare.com>, 2 pg.

"Google Street View," [online] Wikipedia, the free encyclopedia [retrieved Jun. 24, 2014], retrieved from the Internet: <http://en.wikipedia.org/wiki/Google_Street_View>, 14 pg.

Whitman, R., "How to Measure Cell Signal Strength on Android Phones—Tested," [online] Jamie & Adam Tested, Jul. 13, 2010 [retrieved Jun. 24, 2014], retrieved from the Internet: <http://www.tested.com/tech/android/557-how-to-measure-cell-signal-strength-on-android-phones/>, 7 pg.

"Location Basics, Facebook Help Centre, Facebook", [online] Facebook © 2014 [retrieved Jun. 24, 2014], retrieved from the Internet: <https://en-gb.facebook.com/help/337244676357509>, 1 pg.

"OpenPaths," [online] The New York Times Company © 2012 [retrieved Jun. 24, 2014], retrieved from the Internet: <https://openpaths.cc/> 2 pg.

"Street View—Google Maps," [online] Google.com [retrieved Jun. 24, 2014], retrieved from the Internet: <https://www.google.com/maps/views/streetview?gl=us>, 1 pg.

"Triangulation," [online] Wikipedia, the free encyclopedia, Jun. 1, 2014 [retrieved Jun. 24, 2014], retrieved from the Internet: <http://en.wikipedia.org/wiki/Triangulation>, 8 pg.

\* cited by examiner

300

305
Receiving, from a communication device, indications of an origin and a destination of intended travel, wherein the communication device is configured to communicate using a plurality of different types of communication channels

310
Receiving from the communication device a plurality of communication parameters

315
Determining a plurality of suggested travel routes between the origin and the destination, wherein each of the plurality of suggested travel routes is determined based on a respective availability of each of the plurality of different types of communication channels, or each of a plurality of different groups of the plurality of different types of communication channels, satisfying a respective threshold value for a preferred minimum level of availability specified by the communication parameters, and based on each suggested travel route not having a dead zone that exceeds a maximum communication dead zone indicated by the communication parameters

320
Determining at least a subset of the determined plurality of suggested travel routes and, for each of route in the subset, determining a percentage of the route that communication channel availability or connectivity will be maintained and determining recommended modes of communication suitable for use along the route

325
Displaying, via the communication device, visual information, or generating, via the communication device, an audio output signal, indicating at least the subset of the determined plurality of suggested travel routes to a user, and, for each of route in the subset, indicating the percentage of the route that communication channel availability or connectivity will be maintained and indicating recommended modes of communication suitable for use along the route

FIG. 3

TRAVEL ROUTES BASED ON COMMUNICATION CHANNEL AVAILABILITY

BACKGROUND

Arrangements described herein relate to determining travel routes between an origin and a destination.

When planning to travel to a destination, there are often numerous routes available to reach the destination from a given starting point. Users may select a route based on the shortest travel distance or the shortest amount of travel time between the origin and the destination. Mapping applications are widely available to help a user with such planning.

SUMMARY

According to an embodiment of the present invention, arrangements are directed to a method of determining a travel route. The method can include receiving an origin and a destination of intended travel. The method can further include receiving a plurality of first inputs. Each first input can be related to the availability of a respective communication channel between the origin and the destination. Each first input can create at least one data item representing the availability of the respective communication channel. The method can include, using a processor, determining one or more suggested travel routes between the origin and the destination based on at least one of the received plurality of first inputs. The method can further include presenting at least a subset of the determined one or more suggested travel routes can be presented to a user.

A system includes a processor programmed to initiate executable operations. The executable operations include receiving an origin and a destination of intended travel. The executable operations further include receiving a plurality of first inputs. Each first input can be related to the availability of a respective communication channel between the origin and the destination. Each first input can create at least one data item representing the availability of the respective communication channel. One or more suggested travel routes between the origin and the destination can be determined based on at least one of the received plurality of first inputs. At least a subset of the determined one or more suggested travel routes can be presented to a user.

A computer program product for determining a travel route includes a computer readable storage medium having program code embodied therewith. The program code is executable by a processor to perform a method. The method can include receiving an origin and a destination of intended travel. The method can further include receiving a plurality of first inputs. Each first input can be related to the availability of a respective communication channel between the origin and the destination. Each first input can create at least one data item representing the availability of the respective communication channel. The method can include determining one or more suggested travel routes between the origin and the destination based on at least one of the received plurality of first inputs. The method can further include presenting at least a subset of the determined one or more suggested travel routes can be presented to a user.

BRIEF DESCRIPTION OF THE SEVERAL VIEWS OF THE DRAWINGS

FIG. 3 is a flow chart illustrating a method of determining travel routes in accordance with one embodiment disclosed within this specification.

DETAILED DESCRIPTION

While the disclosure concludes with claims defining novel features, it is believed that the various features described herein will be better understood from a consideration of the description in conjunction with the drawings. The process(es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to determining one or more suggested travel routes between an origin and a destination. Such determining can be based on the availability of a respective communication channel between the origin and the destination. Such determining can also be based on one or more of a user's preferred communication parameters.

Figure 1:
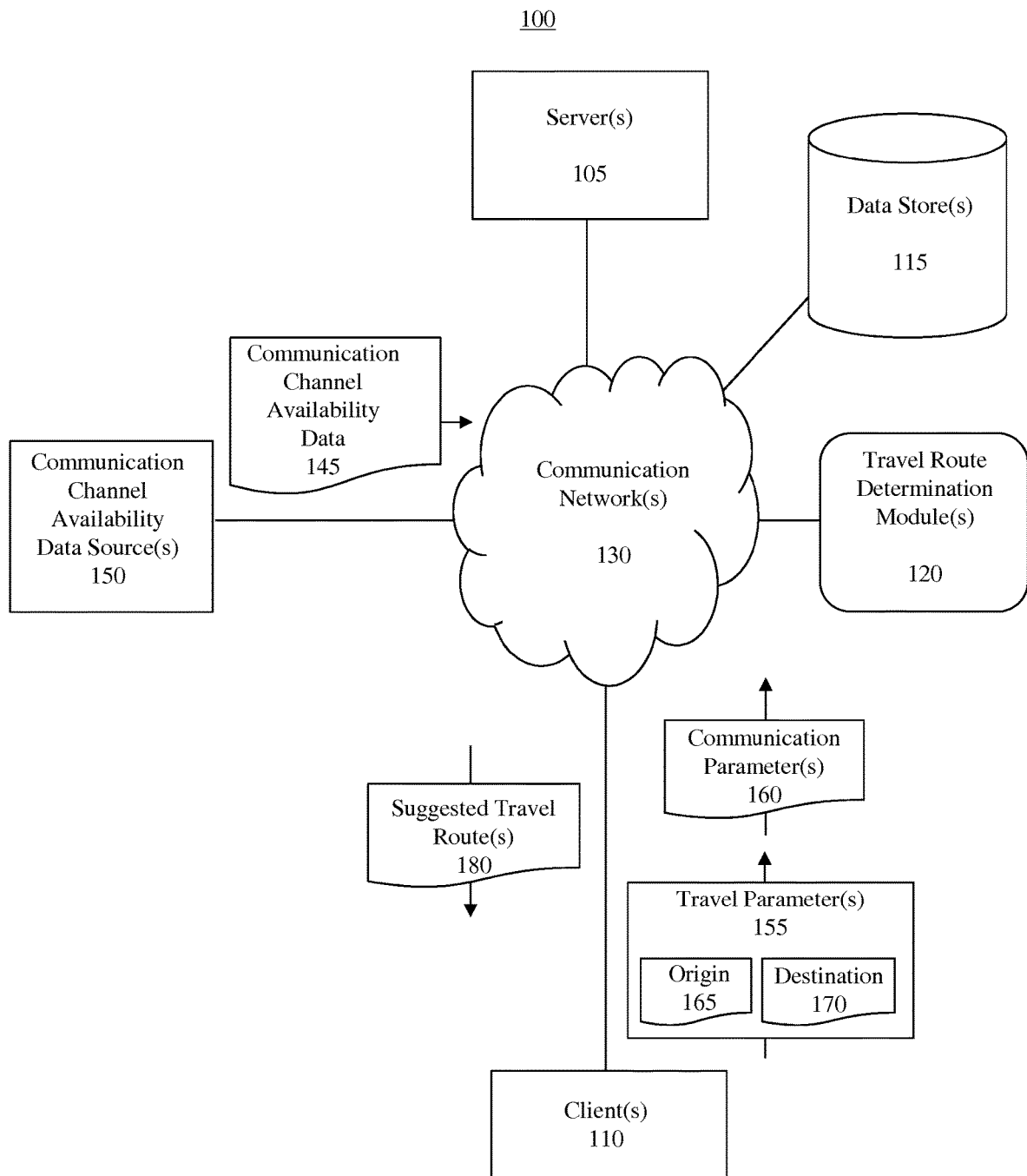
FIG. 1 is a block diagram illustrating a system for determining travel routes in accordance with one embodiment disclosed within this specification.

FIG. 1 is a block diagram illustrating a system 100 for determining travel routes in accordance with one embodiment of the present invention. The system 100 can include one or more servers 105, one or more clients 110, and one or more data stores 115. The system 100 can further include a travel route determination module 120. The system 100 can further include one or more communication channel availability data sources 150.

The various components of system 100 can be communicatively linked through one or more communication networks 130. As used herein, the term "communicatively linked" can include direct or indirect connections through a communication channel or pathway or another component or system. A "communication network" means one or more components designed to transmit and/or receive information from one source to another.

The one or more communication networks 130 can be implemented as, or include, without limitation, a wide area network (WAN), a local area network (LAN), the Public Switched Telephone Network (PSTN), a wireless network, a mobile network, a Virtual Private Network (VPN), the Internet, and/or one or more intranets. The communication network 130 further can be implemented as or include one or more wireless networks, whether short or long range. For example, in terms of short range wireless networks, the communication network 130 can include a local wireless network built using a Bluetooth or one of the IEEE 802 wireless communication protocols, e.g., 802.11a/b/g/i, 802.15, 802.16, 802.20, Wi-Fi Protected Access (WPA), or WPA2. In terms of long range wireless networks, the communication network 130 can include a mobile, cellular, and or satellite-based wireless network and support voice, video, text, and/or any combination thereof. Examples of long range wireless networks can include GSM, TDMA, CDMA, WCDMA networks or the like. The communication network 130 can include wired communication links and/or wireless communication links. The communication network 130 can include any combination of the above networks and/or other types of networks. The network can include one or more routers, switches, access points, wireless access points, and/or the like.

The travel route determination module 120 and/or the data store 115 can be components of the sever 105. In one or more embodiments, the travel route determination module 120 and/or the data store 115 can be stored on, accessed by and/or executed on the server 105. In one or more embodiments, the travel route determination module 120 and/or the data store 115 can be executed on and/or distributed among other processing systems to which the server 105 is communicatively linked. The server 105 can include suitable operational software for performing the various functions described herein. In one or more arrangements, the travel route determination module 120 and/or the data store 115 can be components of the client(s) 110.

In one embodiment, the travel route determination module 120 can be stored on, accessed by and/or executed on the one or more servers 105. The travel route determination module 120 can be implemented as computer readable program code that, when executed by a processor, implement the various processes described herein. As defined herein, the term "processor" means at least one hardware circuit (e.g., an integrated circuit) configured to carry out instructions contained in program code. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

The client(s) 110 can be implemented as any of a variety of communication devices executing suitable communication software. For example, the client(s) can be implemented as a computer system or other information processing system. The client(s) 110 may also be implemented as a portable or mobile computing device, e.g., a mobile telephone, a smart phone, a wireless-enabled personal digital assistant, a portable computer, e.g., laptop, tablet or the like. The client(s) 110 can include and/or execute suitable communication software, which enables the client 110 to communicate with the server 105 and/or other clients through the communication network 130 and perform the functions disclosed herein.

The data store 115 can store, for example, communication channel availability data 145 from one or more communication channel availability data sources 150, as will be described herein. It should be appreciated that while a single data store 115 is illustrated in FIG. 1, a plurality of data stores 115, each storing communication channel availability data 145 or other data can be included. For example, one data store can include communication channel availability data 145 from a first communication channel availability data source while another data store can include communication channel availability data 145 from a second communication channel availability data source. In another example, each data store 115 need not store communication channel availability data 145 from different communication channel availability data sources. Further, the one or more data stores 115 can store other data or information besides communication channel availability data 145.

The client(s) 110 can be configured to send information or data concerning a user's (e.g. a person) travel to one or more components of the system 100. For instance, the client(s) 110 can be configured to send such information or data to the server(s) 105, the data store(s) 115 and/or the travel route determination module(s) 120.

The information or data concerning a user's travel can include one or more travel parameters 155 and/or one or more communication parameters 160. The one or more travel parameters 155 can be any information used to at least initially identify suggested travel routes. For instance, the one or more travel parameters 155 can include an origin 165 of a user's planned travel. The one or more travel parameters 155 can include a destination 170 of the user's planned travel. The one or more travel parameters 155 can also include any other travel preferences of a user, including, for example, things to avoid (e.g. toll roads, highways, ferries, etc.) or mode of transportation (e.g., car, bicycle, walking, etc.).

The one or more communication parameters 160 can be any information used to define a user's communication actual and/or preferred usage of a mobile communication device. The one or more communication parameters 160 can be collected in any suitable manner. For instance, the one or more communication parameters 160 can be received by a user input, determined from a user's prior usage data, and/or provided as a system default.

Various non-limiting examples of the one or more communication parameters 160 will now be described. In one or more arrangements, the one or more communication parameters 160 can include a user's preferred type of communication connection, an application usage profile, and/or a user's preferred type of communication device. An application usage profile is any information concerning a particular user's usage of one or more communication-related applications or services. As an example, a first person may communicate by instant messaging while car-pooling to work. As another example, a second person may use a voice over internet protocol (VOIP) service to listen to conference calls while traveling to work. As a further example, a third person may participate in video conference calls while commuting to work. An application usage profile can be created for each user of a client 110. The application usage file can also take into account other information, such as the historical usage data, location data, temporal data and content data (e.g. a user uses high definition video as opposed to a low definition and/or grayscale video).

In one or more arrangements, the one or more communication parameters 160 can include user defined acceptable communication parameters. For instance, the one or more communication parameters 160 can include a guaranteed minimum amount or a guaranteed maximum amount of some aspect of communication connectivity between the origin and the destination. As an example, the user can input its preference for a guaranteed 100% cellular telephone signal availability and/or at least 90% data via 4G or other IEEE 802 wireless communications (e.g., 802.11, 802.16, WPA, WPA2, TDMA, CDMA, WCDMA, GSM, GPRS, UTMS, 3G, EUTAN, UMB, OFDM, or LTE systems) availability. Arrangements described herein can determine one or travel routes that can match such communication parameters.

The one or more communication parameters 160 can include a minimum connection speed. The one or more communication parameters 160 can include a maximum communication channel load. The one or more communication parameters 160 can include signal strength of a communication channel. The one or more communication parameters 160 can include a maximum desired dead zone or blackout (e.g., an area in which a communication channel is not available or signal strength or other characteristic of the communication channel is below a predefined threshold). The maximum desired dead zone can be quantified in any suitable manner, such as in terms of time, distance, a ratio between time and needed bandwidth, and/or combinations thereof, just to name a few possibilities. The one or more communication parameters 160 can include an indication to maximize failover. "Failover" means, when one available communication channel becomes unavailable for any reason (e.g. failure, downtime, out of range, etc.), another communication channel is available to support user communications.

The travel route determination module 120 can collect communication channel availability data 145. The collected communication channel availability data 145 can be stored in the data store 115. The communication channel availability data 145 can be collected in any suitable manner by the travel route determination module 120. The collection of the communication channel availability data 145 can be performed on any suitable basis, such as continuous, periodic, irregular or even randomly. The travel route determination module 120 can be configured to process the communication channel availability data 145, along with the travel parameter(s) 155 and the communication parameter(s) 160, to determine one or more suggested travel routes 180 from the input origin 165 to the input destination 170.

The travel route determination module 120 can collect the communication channel availability data 145 from one or more communication channel availability data sources 150. "Communication channel availability data source" means any source from which data relating to the availability of one or more communication channels between the origin and the destination of intended travel can be obtained. As used herein, "availability of a respective communication channel" means information about a user's ability to use a communication channel. Such information can include past, present, future and/or predictive information. Examples of such information include availability, type, strength, speed, bandwidth, accessibility, losses, and/or other characteristics of the communication channel.

The communication channel availability data sources 150 can include current or real time data. As used herein, the term "real time" means a level of processing responsiveness that a user or system senses as sufficiently immediate for a particular process or determination to be made, or that enables the processor to keep up with some external process. The communication connectivity data sources 150 can include historical data. The communication connectivity data sources 150 can include predicted data. Data can be obtained from the communication connectivity data sources 150 in any suitable manner, including, for example, by, directly or indirectly, sensing, measuring, detecting, extrapolating, interpolating, inferring, accessing and/or recording. Data obtained from the one or more communication connectivity data sources 150 can be stored in the data store 115.

Figure 2:
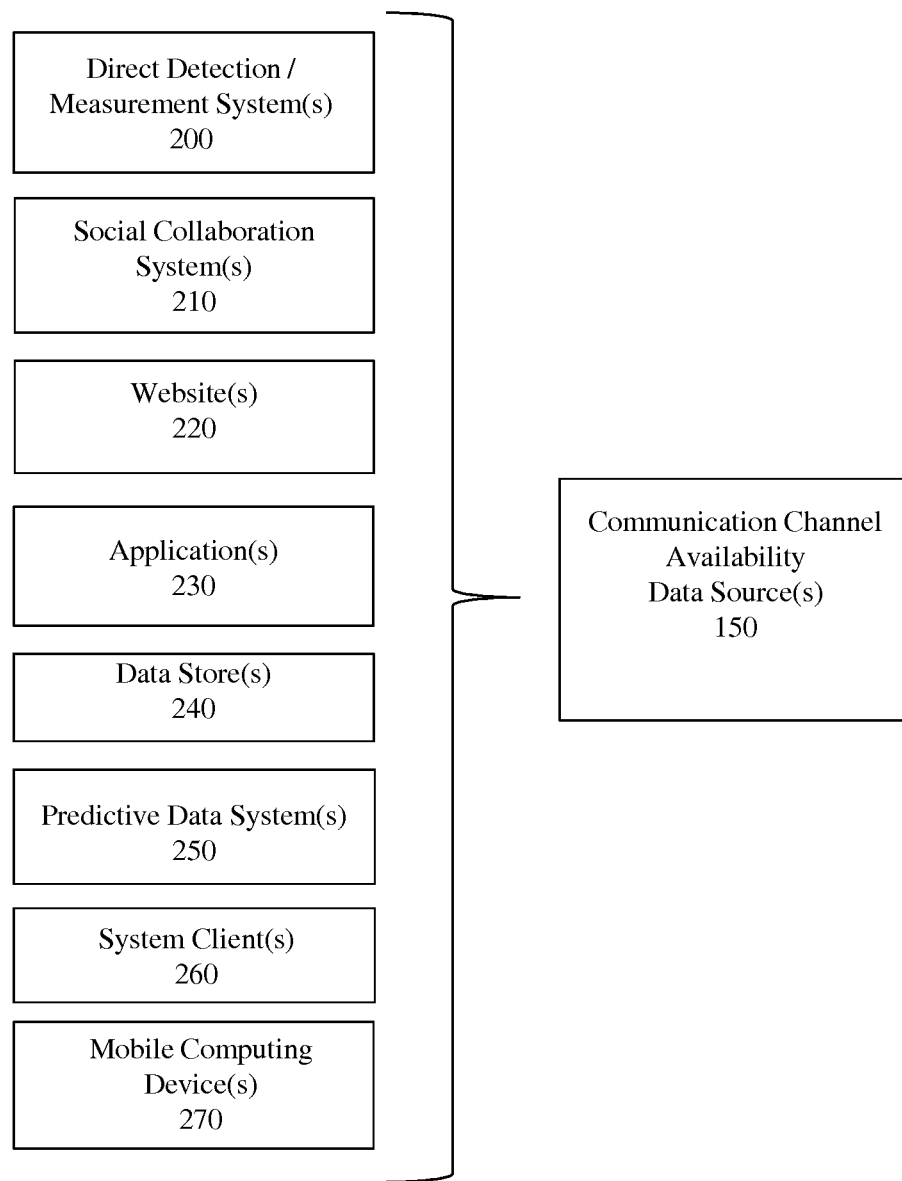
FIG. 2 is a block diagram illustrating various examples of communication channel availability data sources in accordance with one embodiment disclosed within this specification.

FIG. 2 shows various non-limiting examples of communication channel availability data sources 150. For instance, the communication channel availability data sources 150 can include one or more direct detection/measurement data sources 200, one or more social collaboration systems 210, one or more websites 220, one or more applications 230, one or more data stores 240, one or more predictive data systems 250, one or more system clients 260, and/or one or more mobile computing devices 250. One or more of these communication channel availability data sources 150 can be communicatively linked to the server 105, the data store 115, the travel route determination module 120 and/or the client 110. In some instances, one or more of the communication channel availability data sources 150 can be continuously communicatively linked to the server 105, the data store 115, the travel route determination module 120 and/or the client 110. In some instances, one or more of the communication channel availability data sources 150 may not be continuously communicatively linked to the server 105, the data store 115, the travel route determination module 120 and/or the client 110. For instance, at least some of the communication channel availability data sources 150 may be out of communication (e.g. due to being out of signal range, an outage, etc.) with the server 105, the data store 115, the travel route determination module 120 and/or the client 110 during and/or along at least a portion of the travel route. Each of the various examples of communication channel availability data sources 150 will be described in turn below.

Again, the communication channel availability data sources 150 can include one or more direct detection/measurement data sources 200. "Direct detection and/or measurement system" as used herein refers to device(s), component(s), and/or system(s) configured to directly detect, determine, assess, measure and/or sense any suitable information or data relating to the availability of a communication channel. For instance, the direct detection and/or measurement system 260 can determine the number of WiFi hotspots available in a given location. As a further example, the direct detection and/or measurement system 260 detect the signal strength, packet loss, latency and/or other characteristic of a particular communication channel in a particular location. The direct detection and/or measurement system 260 can include one or more suitable sensors to collect such data. The sensors can be communicatively linked to the server 105, the data store 115, the travel route determination module 120 and/or the client 110.

As noted above, the communication channel availability data sources 150 can include one or more social collaboration systems 210. "Social collaboration system" as used herein refers to applications, programs and/or web-based technologies used to turn communication into interactive dialogue between organizations, communities, and individuals. Examples of social collaboration systems include, for example, collaborative projects, blogs, micro blogs, wikis, content communities, websites and social networking sites. The social collaboration system 210 can enable a user to share location information and/or communication channel availability information. Alternatively or in addition, the social collaboration system 210 can collect location information and/or communication channel availability information. The social collaboration system 210 can also collect temporal information. The social collaboration system 210 can collect current and historical data.

The location information can be in any suitable form and obtained from any suitable source. For instance, the location information can be based on any one of a number of satellite positioning systems, such as the United States Global Positioning System (GPS) or any system that uses satellites from a combination of satellite systems, or any satellite system developed in the future. The location information can be obtained from Transmission Control Protocol (TCP) and/or a Geographic information system (GIS) and location services. Alternatively or in addition, the location information can be based on access point geolocation services, such as using the W3C Geolocation Application Programming Interface (API). The location information can be obtained through the consulting of location information servers, including, for example, Internet protocol (IP) address, Wi-Fi and Bluetooth Media Access Control (MAC) address, radio-frequency identification (RFID), Wi-Fi connection location, or device GPS and Global System for Mobile Communications (GSM)/code division multiple access (CDMA) cell IDs.

The one or more websites 220 can be any website that enables a user to share location information and/or communication channel availability information. Alternatively or in addition, the one or more websites can collect location information and/or communication channel availability information. The one or more websites 220 can also collect temporal information. The one or more websites 220 can collect current and historical data.

The one or more applications 230 can be any application that enables a user to share location information and/or communication channel availability information. Alternatively or in addition, the one or more applications 230 can collect location information and/or communication channel availability information. The one or more applications 230 can also collect temporal information. The one or more applications 230 can collect current and historical data. In one or more arrangements, the application 230 can be a mapping application.

The one or more data stores 240 can be any data store containing location information and/or communication channel availability information. As an example, the data store 240 can be a user-contributed data store for personal location data files. The data store 240 can be a public or a private data store. The data store 240 can also collect temporal information. The data store 240 can collect current and historical data (e.g. historical signal data from specific locations).

It should be noted that, in at least some instances, the data obtained from the social collaboration systems 210, the websites 220, the applications 230 and/or the data stores 230 may be indirect in nature. As an example, a user may post on a social collaboration website that it was in a particular location, and such post may include information as to the type of device being used (e.g. "posted from my Smartphone X"). As such, the system 100 can infer that WiFi is available at that particular location. Any temporal information associated with such a post can be collected. As another example, a user may post to a website a rating of an Internet Service Provider (ISP) in a given area. Based on whether a favorable rating or an unfavorable rating is provided, the availability of a communication channel in a given area can be inferred.

The one or more predictive data systems 250 can be any source of future information or data concerning communication channel availability between an origin and a destination. For instance, based on current communication channel data, historical patterns, time of day, and/or other information, the one or more predictive data systems 250 can predict that communication channels will become very heavy during a certain period of a day, so the system 100 can take this predictive data into account when determining a suggested travel route. The predictive data system 230 can access data from any of the communication connectivity data sources 150 described herein and/or other source. In some arrangements, the predictive system 230 can be a part of one or more of the other communication connectivity data sources 150 described herein. The one or more collaboration system 140 can be communicatively linked to the server 105, the data store 115, the travel route determination module 120 and/or the client 110.

The one or more system clients 260 can be any client devices 110 associated with the system 100. The system clients 260 can collect location information and/or communication channel availability information. The system clients 260 can also collect temporal information. The system clients 260 can collect current and historical data. The system 100 can aggregate historical connectivity data (e.g., WiFi, 3G, 4G, etc.) and location information (e.g., GPS coordinates, geolocation) from a plurality of system clients 260 in a particular location (e.g. along the travel route).

The one or more mobile computing devices 270 can be any portable or mobile computing device, e.g., a mobile telephone, a smart phone, a wireless-enabled personal digital assistant, a portable computer, e.g., laptop, tablet or the like. Each of these devices can include and/or execute suitable communication software, which enables the device to communicate with the server 105 and/or the module 120 through the communication network 130.

Any suitable data can be obtained from the one or more system clients 260 and/or the one or more mobile computing devices 270. For instance, the system 100 can determine that there is good communication channel availability for a particular device in a particular location because a user of that type of device connected to a communication channel (e.g. an audio conference) using a smartphone or mobile phone in a particular location. Over time, data can be collected at such location to develop an understanding of what communication channels are available at that particular location.

The communication channel availability data 145 can be processed, analyzed and/or assessed to determine one or more suggested travel routes. Such processing, analyzing and/or assessing can be performed by the travel route determination module 120. Any suitable processing, analyzing and/or assessing can be performed on the communication channel availability data 145. As an example, in one or more arrangements, any suitable regression analysis can be used to analyze the data. The regression analysis can be used to understand variables that have the strong regression effect (e.g., a p value of less than 0.001) and/or to derive a regression model.

A regression model can be used to facilitate the determination of a suggested travel route 180. For instance, a regression model can be used to determine how many access points can be expected for a particular type of communication (e.g., a web conference) that a user is scheduled to attend at a particular time. Further, the regression model can determine what forms of communication are available to a user to participate in a particular event. As an example, the regression model can determine whether a user can participate in a web conference using voice, video and/or screen sharing communication channels.

In determining the one or more suggested travel routes 180, the travel route determination module 120 can weigh the communication channel availability data 145 in any suitable manner. For example, data obtained from direct measurement/detection systems 200 and/or from system client(s) 260 can have an associated weight that is greater than the weight associated with data from other sources, such as inferential or anecdotal data.

In determining the one or more suggested travel routes 180, the travel route determination module 120 can process any communication parameters 160 and/or any travel parameters 155. In some instances, the travel route determination module 120 can assess the collected communication channel availability data 145 relative to one or more of the communication parameters 160.

In one or more arrangements, the travel route determination module 120 can determine a suggested travel route 180 so that a maximum failover of communication channels is available along that route. In one or more arrangements, the travel route determination module 120 can determine a suggested travel route 180 based on a user's communication parameter 160 including a desired to avoid dead zones. Thus, one potential travel route for a user may include one or more known dead zones, so an alternative route will be chosen instead.

In some arrangements, the travel route determination module 120 can provide recommendations to accompany the suggested travel routes 180. For instance, the travel route determination module 120 can recommend additional routes with alternative communication channels which may or may not match a user's communication parameters 160.

In one or more arrangements, the travel route determination module 120 can present the suggested travel routes 180 to a user in any suitable form. In one or more arrangements, the travel route determination module 120 can present a tiered level of recommendations. For instance, the travel route determination module 120 can present each suggested route with one or more associated characteristics. As an example, the associated characteristics can include: total distance, percentage of the route that communication channel availability or connectivity will be maintained, and/or a recommended modes of communication (e.g. applications or services) suitable for use along the route. One example of a suggested travel routes 180 may be: Route 1: 50 kilometers, 80% communication channel connectivity maintained, and recommend mode(s) of communication: instant messaging application with offline messaging functionality enabled. Another example of an alternative suggested travel route 180 may be: Route 2, 54 kilometers, 98% communication channel connectivity maintained, and recommend mode(s) of communication: email, instant messaging, web conferencing and VOIP calls.

The system 100 can identify, assess, monitor and determine communication channel connectivity by type (e.g. GPRS, 3G, 4G, WiFi, satellite, cellular calls, etc.) for all devices (e.g. clients 110) communicatively coupled to one or more elements of the system 100. Each client 110 can record data and information regarding the routes taken and communication channel availability data along the route. The system 100 (e.g. the server 105, the data store 115 and/or the travel route determination module 120) can be updated with such data and information at any suitable time, including, for example, after each journey. Over time, the system 100 can obtain data and information about communication channel availability data 145 from a plurality of clients 110 on a particular travel route or portions thereof. In some arrangements, when a user searches for a suggested travel route, the system 100 can determine a mean or a median level of communication channel availability achieved by other users within a predetermined period of time (e.g. a recent period of time such as the last day, week, month, etc.) for the given travel route.

FIG. 3 is a flow chart illustrating a method 300 of determining a travel route in accordance with one embodiment disclosed within this specification. At step 305, an origin and a destination of a travel route can be received from a communication device. The communication device is configured to communicate using a plurality of different types of communication channels. The origin and the destination can be defined in any suitable manner. For instance, the origin and/or the destination can be defined by GPS coordinates, a city, a state, a mailing address, a zip code, an intersection, a landmark and/or a business name, just to name a few possibilities.

At step 310, a plurality of communication parameters can be received from the communication device. The communication parameters can be related to the availability of a respective communication channel between the origin and the destination. Thus, the availability of a respective communication channel can be assessed in one or more points between the origin and the destination, one or more segments or portions between the original and the designation, and/or along one or more entire routes between the origin and the destination. In one or more arrangements, the communication parameters can create at least one data item representing the availability of the respective communication channel. The plurality of communication parameters can be aggregated.

At step 315, a plurality of suggested travel routes between the origin and the destination can be determined. Such determining can be performed using a processor. Each of the plurality of suggested travel routes can be determined based on a respective availability of each of the plurality of different types of communication channels, or each of a plurality of different groups of the plurality of different types of communication channels, satisfying a respective threshold value for a preferred minimum level of availability specified by the communication parameters, and based on each suggested travel route not having a dead zone that exceeds a maximum communication dead zone indicated by the communication parameters.

At step 320, at least a subset of the determined plurality of suggested travel routes can be determined. For each route in the subset, a percentage of the route that communication channel availability or connectivity will be maintained can be determined. Further, recommended modes of communication suitable for use along the route can be determined. Such determining can be performed using the processor. The term "at least a subset of" includes one or more of the determined travel routes. In some instances, there may be one determined travel route. In such case, "at least a subset of" means the one determined travel route. In some instances, there can be a plurality of determined travel routes. In such case, "at least a subset of" means at least one of the plurality of determined travel routes.

At step 325, visual information can be displayed via the communication device, or an audio output signal can be generated via the communication device, indicating at least the subset of the determined plurality of suggested travel routes to a user, and, for each of route in the subset, indicating the percentage of the route that communication channel availability or connectivity will be maintained and indicating recommended modes of communication suitable for use along the route.

At least a subset of the determined one or more suggested travel routes can be presented to a user in any suitable manner. As an example, the travel route can be presented in a visual form on a display of the client. For instance, the travel route can be presented as text directions. Alternatively or in addition, the travel route can be presented on a map. The travel route can be noted by any suitable marking or highlighting of the route on the map.

In some instances, one or more portions of the travel route can be marked in a manner to indicate the available communication channel along that portion of the travel route. As an example, one portion of a determined travel route can be marked in a first color to indicate that a first type of communication channel is available. A second portion of the determined travel route can be marked in a second color to indicate that a second type of communication channel is available. A third portion of the determined travel route can be marked in a third color to indicate that a third type of communication channel is available. In some instances, there can be overlap between the first portion, the second portion and/or the third portion. In such areas of overlap, there can be a plurality of communication channels available.

In some instances, the first portion, the second portion and/or the third portion may not overlap each other. Such an arrangement may occur when the received first inputs indicate that there is no overlap in communication channel availability. Alternatively, the system may be configured to present to a user specific portions of the travel route and the communication channel meeting some criteria for that portion of the travel route. For instance, a travel route can be divided into a plurality of portions. The portions can be determined in any suitable manner. The portions may or may not be identical in length. The system can be configured to indicate which available communication channel has the strongest signal or other criterion for each segment.

Alternatively or in addition to a visual display of the determined travel routes, the system can be configured to present the determined travel routes as an audio output on the client. If a particular route is selected, the client can provide navigation by audio output.

When multiple suggested travel routes are presented, a user can view the type, strength or other characteristic of the available communication channels along each suggested travel route. The user can select which of the travel routes is suitable for its purposes.

One or more steps of the method 300 can be updated and/or adjusted in real-time. For instance, the receiving of a plurality of first inputs can continue to occur in real-time. As such, the determined one or more suggested travel routes between the origin and the destination can be updated in real-time. Likewise, the presentation of at least a subset of the determined one or more suggested travel routes to a user can be performed in real-time. Thus, as a user travels along a selected route, a user can be apprised of changes in one or more aspects of the available communication channels and/ or can be apprised of newly available communication channels.

One or more embodiments described herein can be adaptive and/or updated based on real-time information. One or more embodiments described herein can assist a user in selecting a travel route to maintain communication connectivity during travel. One or more embodiments described herein can account for a user's communication preferences in determining a suggested travel route. One or more embodiments described herein can support users in maximizing the level of communication connectivity along a travel route.

Figure 4:
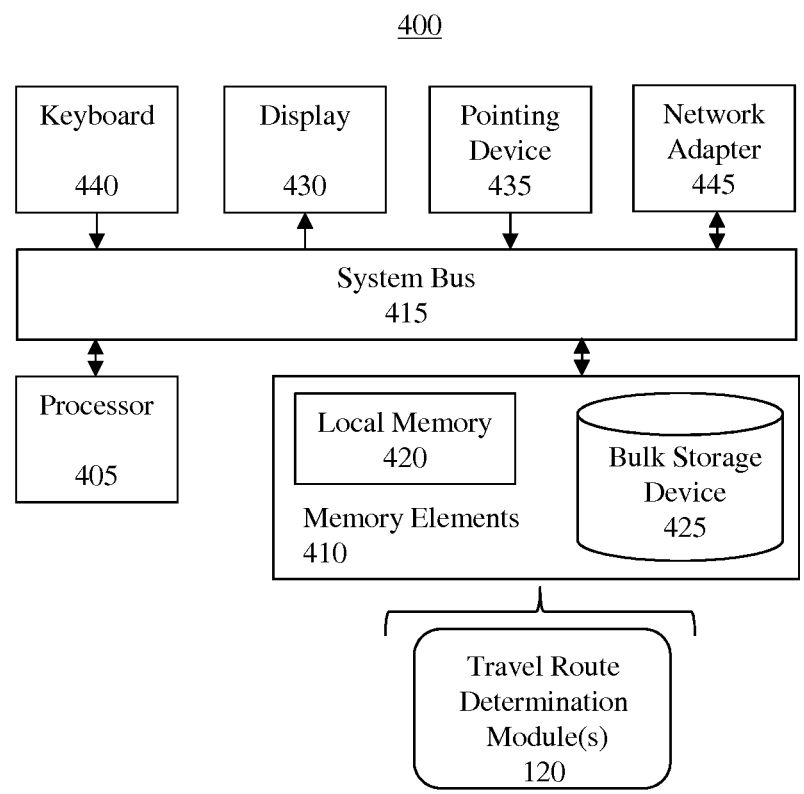
FIG. 4 is a block diagram illustrating a system for determining travel routes in accordance with one embodiment disclosed within this specification.

FIG. 4 is a block diagram illustrating an example of a data processing system 400. System 400 can include at least one processor (e.g., a central processing unit) 405 coupled to memory elements 410 through a system bus 415 or other suitable circuitry. As such, system 400 can store program code within memory elements 410. Processor 405 executes the program code accessed from memory elements 410 via system bus 415 or the other suitable circuitry.

In one aspect, system 400 is implemented as a computer or other programmable data processing apparatus that is suitable for storing and/or executing program code. It should be appreciated, however, that system 400 can be implemented in the form of any system including a processor and memory that is capable of performing and/or initiating the functions and/or operations described within this disclosure. Further, system 400 can be implemented in any of a variety of different form factors including, but not limited to, a portable device such as a mobile communication device, a tablet computing and/or communication device, a laptop computing device, a desktop computing device, a server, or the like.

Memory elements 410 include one or more physical memory devices such as, for example, local memory 420 and one or more bulk storage devices 425. Local memory 420 refers to RAM or other non-persistent memory device(s) generally used during actual execution of the program code. Bulk storage device(s) 425 can be implemented as a hard disk drive (HDD), solid state drive (SSD), or other persistent data storage device. System 400 also can include one or more cache memories (not shown) that provide temporary storage of at least some program code in order to reduce the number of times program code must be retrieved from bulk storage device 425 during execution.

Input/output (I/O) devices such as a keyboard 440, a display 430, and a pointing device 435 optionally can be coupled to system 400. The I/O devices can be coupled to system 400 either directly or through intervening I/O controllers. One or more network adapters 445 also can be coupled to system 400 to enable system 400 to become coupled to other systems, computer systems, remote printers, and/or remote storage devices through intervening private or public networks. Modems, cable modems, wireless transceivers, and Ethernet cards are examples of different types of network adapters 445 that can be used with system 400.

As pictured in FIG. 4, memory elements 410 can store the travel route determination module 120. The travel route determination module 120, being implemented in the form of executable program code, is executed by system 400 and, as such, is considered an integrated part of system 400. The travel route determination module 120 can receive one or more inputs relating to a travel parameter, such as the original and a destination of intended travel. The travel route determination module 120 can receive a plurality of first inputs related to the availability of a respective communication channel between an origin and a destination of intended travel. The travel route determination module 120 can determine one or more suggested travel routes between the origin and the destination based on at least one of the received plurality of first inputs. The travel route determination module 120 can present at least a subset of the determined one or more suggested travel routes to a user. Moreover, the travel route determination module 120, including any inputs, parameters and/or attributes utilized by the travel route determination module 120, are functional data structures that impart functionality when employed as part of system 400.

The determined suggested travel routes can be output to, and stored within, memory elements 410. As used herein, "outputting" and/or "output" can mean storing in memory elements 410, for example, writing to a file stored in memory elements 410, writing to display 435 or other peripheral output device, playing audible notifications, sending or transmitting to another system, exporting, or the like.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

The present invention may be a system, a method, and/or a computer program product. The computer program product may include a computer readable storage medium (or media) having computer readable program instructions thereon for causing a processor to carry out aspects of the present invention.

The term "computer readable storage medium" means a storage medium that contains or stores program code for use by or in connection with an instruction execution system, apparatus, or device. As defined herein, a "computer readable storage medium" is not a transitory, propagating signal per se. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

Reference throughout this disclosure to "one embodiment," "an embodiment," or similar language means that a particular feature, structure, or characteristic described in connection with the embodiment is included in at least one embodiment described within this disclosure. Thus, appearances of the phrases "in one embodiment," "in an embodiment," and similar language throughout this disclosure may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of determining a travel route, comprising:
    receiving, from a communication device, indications of an origin and a destination of intended travel, wherein the communication device is configured to communicate using a plurality of different types of communication channels;
    receiving from the communication device a plurality of communication parameters;
    determining, using a processor, a plurality of suggested travel routes between the origin and the destination, wherein each of the plurality of suggested travel routes is determined based on a respective availability of each of the plurality of different types of communication channels, or each of a plurality of different groups of the plurality of different types of communication channels, satisfying a respective threshold value for a preferred minimum level of availability specified by the communication parameters, and based on each suggested travel route not having a dead zone that exceeds a maximum communication dead zone indicated by the communication parameters;
    determining, using the processor, at least a subset of the determined plurality of suggested travel routes and, for each of route in the subset, determining a percentage of the route that communication channel availability or connectivity will be maintained and determining recommended modes of communication suitable for use along the route; and
    displaying, via the communication device, visual information, or generating, via the communication device, an audio output signal, indicating at least the subset of the determined plurality of suggested travel routes to a user, and, for each of route in the subset, indicating the percentage of the route that communication channel availability or connectivity will be maintained and indicating recommended modes of communication suitable for use along the route.

2. The method of claim 1, wherein the determining the plurality of suggested travel routes between the origin and the destination based on the plurality of communication parameters is performed in real-time.

3. The method of claim 1, wherein the presenting at least the subset of the determined plurality of suggested travel routes to the user includes presenting at least the subset of the determined one or more suggested travel routes on a map.

4. The method of claim 1, wherein:
    the plurality of communications parameters comprise at least one parameter indicating an availability of a respective communication channel between the origin and the destination and creating at least one data item representing the availability of the respective communication channel; and
    the determining the plurality of suggested travel routes comprises determining travel routes that each satisfy the availability of the respective communication channel between the origin and the destination.

5. The method of claim 1, wherein:
    the plurality of communications parameters comprise at least one parameter indicating another subset of the plurality of different types of communication channels preferred by the user and a respective threshold value for a preferred minimum level of availability for each type of communication channel preferred by the user; and
    the determining the plurality of suggested travel routes comprises determining travel routes that each are within the another subset of the plurality of different types of communication channels preferred by the user and that provide at least the respective threshold value for the preferred minimum level of availability for the respective type of communication channel preferred by the user.

6. The method of claim 1, wherein:
- the plurality of communications parameters comprise at least one parameter indicating a maximum communication dead zone desired by the user, wherein the communication dead zone is an area in which the different types of communication channels are not available or their respective signal strengths are below at least one threshold level; and
- the determining the plurality of suggested travel routes comprises determining travel routes that each have a respective communication dead zone not exceeding the maximum communication dead zone desired by the user.

7. The method of claim 1, further comprising:
- receiving from the communication device at least one travel parameter, the travel parameter indicating things to avoid between the origin and the destination of intended travel;
- wherein the determining the plurality of suggested travel routes comprises determining travel routes that do not include the things to avoid between the origin and the destination of intended travel.

8. The method of claim 1, wherein the plurality of communications parameters comprise at least one parameter indicating an application usage profile of a user.

* * * * *